May 16, 1950     R. G. CUDINI     2,507,503
DEEP DRILLING MACHINE
Filed Feb. 16, 1948     5 Sheets-Sheet 3
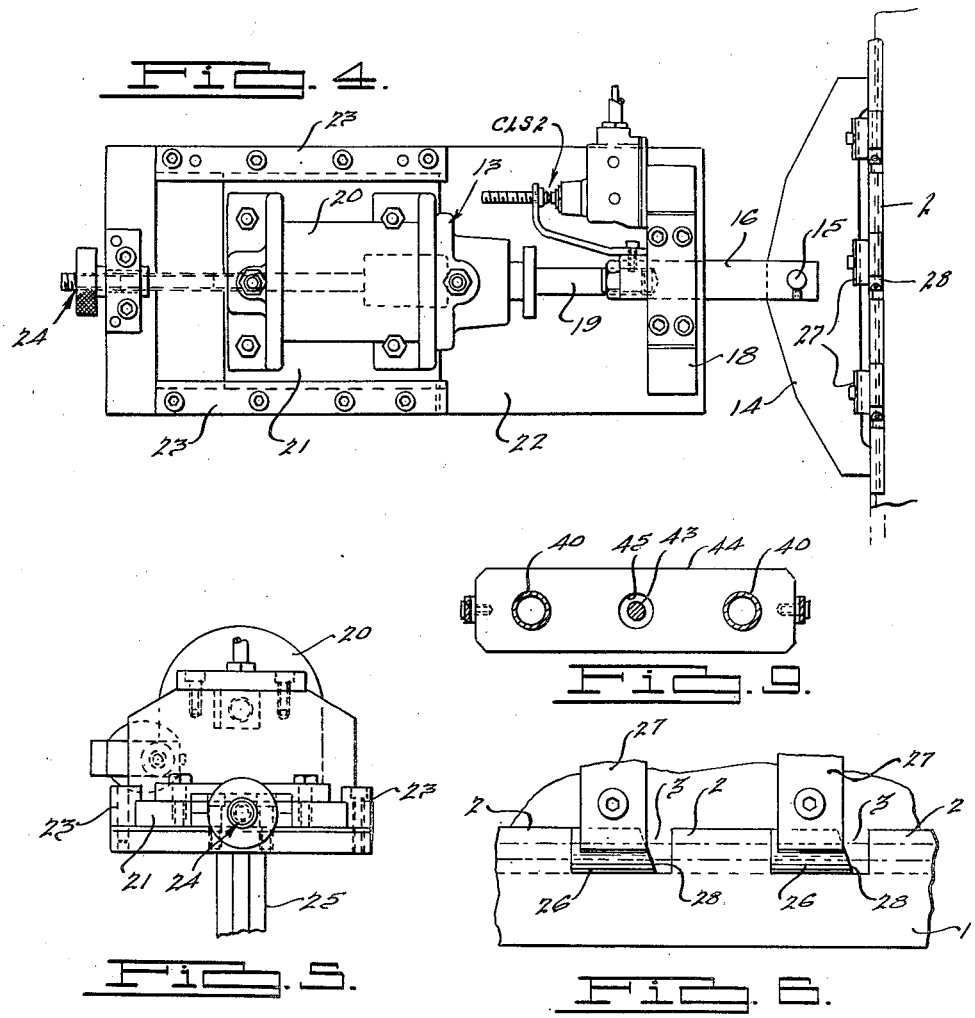
INVENTOR.
Roger G. Cudini
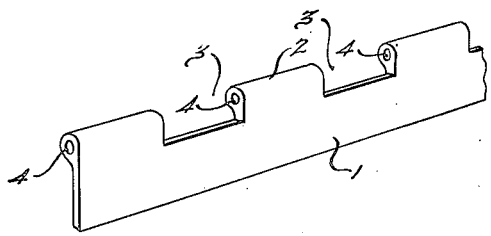
ATTORNEYS.

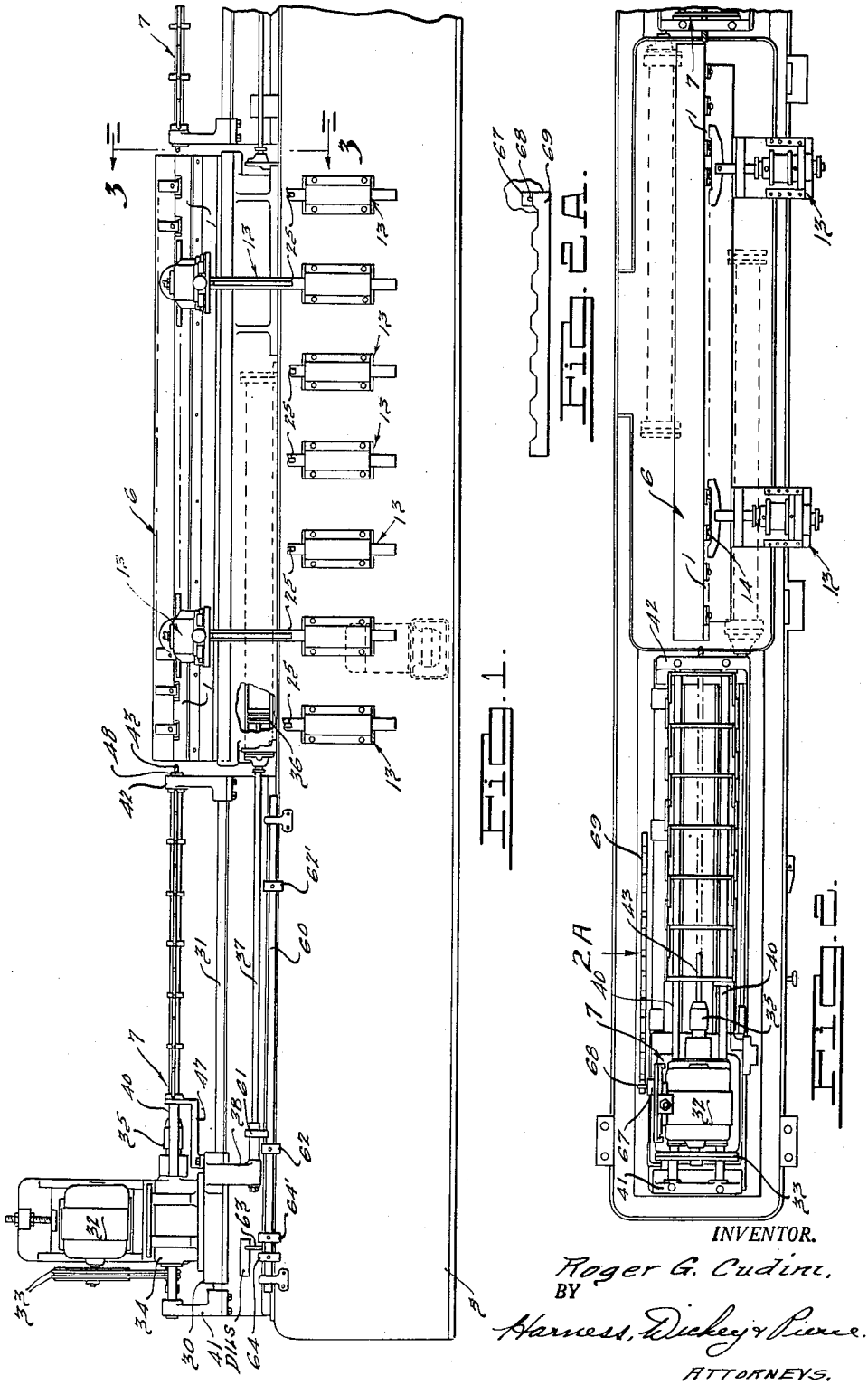

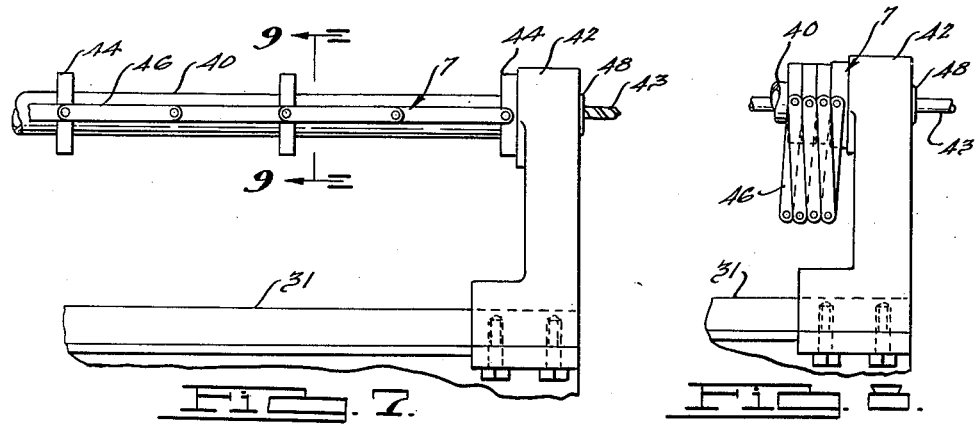
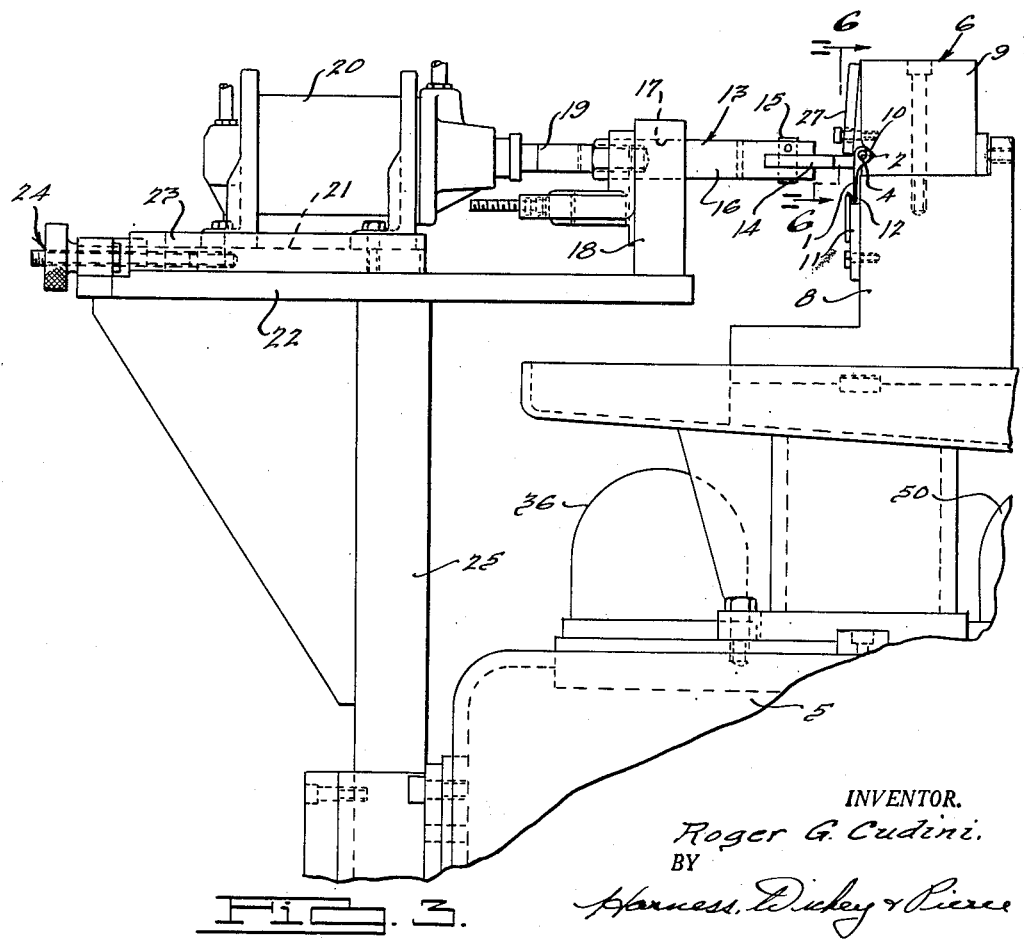

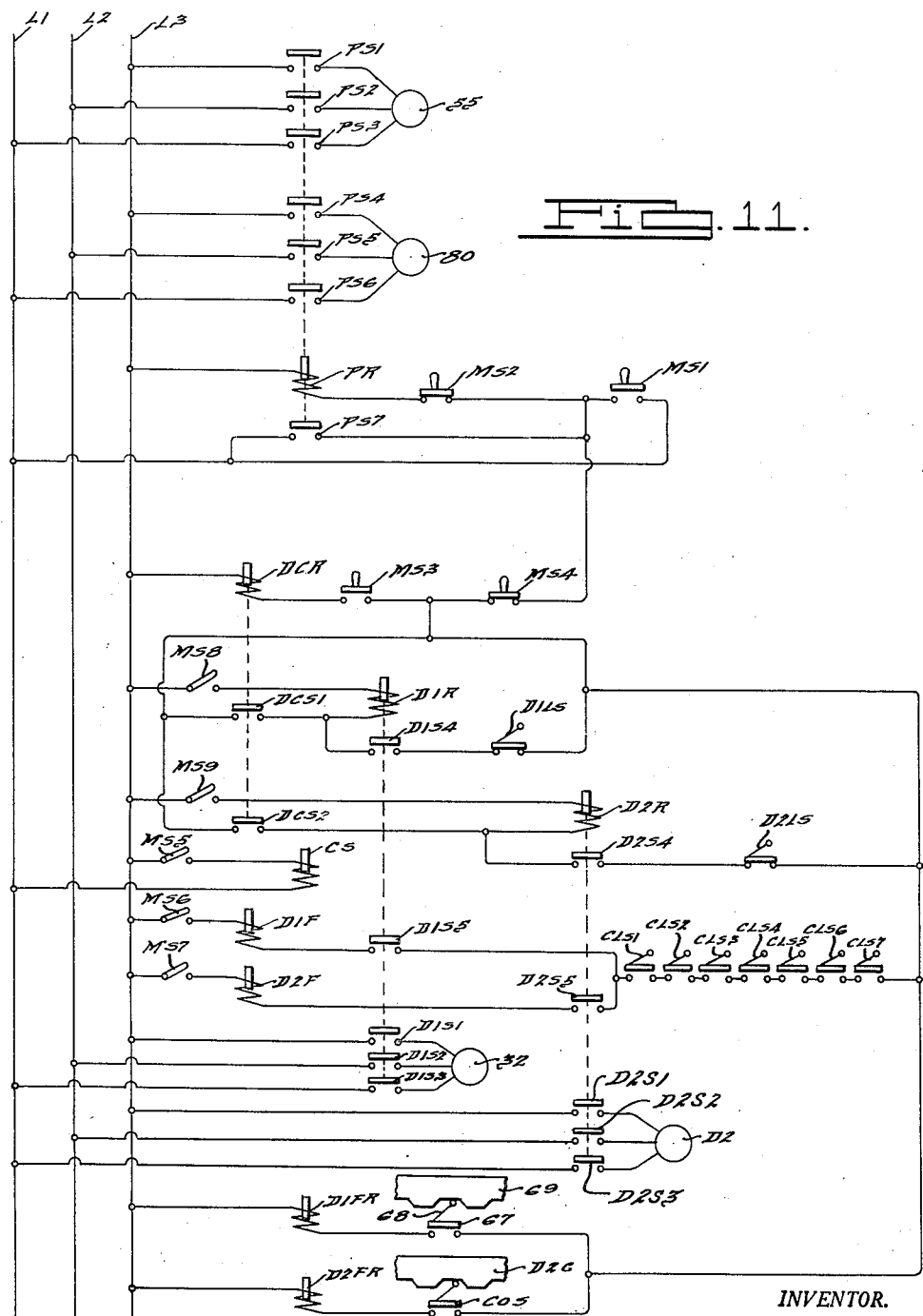

May 16, 1950  R. G. CUDINI  2,507,503
DEEP DRILLING MACHINE
Filed Feb. 16, 1948  5 Sheets-Sheet 5

INVENTOR.
Roger G. Cudini.
BY
Harness, Dickey & Pierce
ATTORNEYS.

Patented May 16, 1950

2,507,503

UNITED STATES PATENT OFFICE 2,507,503

DEEP DRILLING MACHINE

Roger G. Cudini, Birmingham, Mich., assignor to Moynahan Bronze Company, Detroit, Mich., a corporation of Michigan Application February 16, 1948, Serial No. 8,669

3 Claims. (Cl. 77—62)

The present invention relates to improvements in drilling machines.

One of the primary objects of the present invention is to provide improvements in drilling machines whereby the concentricity of holes in an elongated workpiece is precisely maintained.

A further object of the invention is to provide improvements in drilling machines whereby the concentricity of the holes in mating, elongated workpieces is precisely maintained, where the holes are formed in alternating projections on one workpiece which are adapted to mate in complementary recesses between the projections on a mating workpiece, so that the finished workpieces are uniform and will properly mate with similarly produced workpieces.

A further object of the invention is to provide improvements in drilling machines whereby it is possible to accurately drill holes throughout the length of a workpiece of considerable length.

A further object of the invention is to provide improvements in the manner of supporting a drill of considerable length, as compared to its diameter, as it moves into and through the workpiece.

A further object of the invention is to provide improvements in guiding the drill through a workpiece of considerable length and in providing for the removal of chips as the drill progresses through the workpiece.

A further object of the invention is to provide improvements in drilling machines employing drills of considerable length where the drill is supported at spaced intervals completely therealong while passing to and from and through an elongated workpiece so that the axis of the drill is held in its proper position at all times.

Other objects of the invention will be apparent from the following specification, the drawings relating thereto, and from the claims hereinafter set forth.

In the drawings in which like numerals are used to designate like parts in the several views throughout:

Figure 1 is a partial front elevational view of a drilling machine embodying features of the present invention;

Fig. 2 is a top plan view thereof;

Fig. 2A is an elevational view of a portion of the structure shown in Fig. 2 looking in the direction of the arrow 2A;

Fig. 3 is an enlarged partial elevational view taken substantially along the line 3—3 of Fig. 1;

Fig. 4 is a top plan view of the structure shown in Fig. 3;

Fig. 5 is an end elevational view taken from the left of the structure shown in Fig. 4;

Fig. 6 is a partial elevational view taken substantially along the line 6—6 of Fig. 3;

Fig. 7 is an enlarged partial side-elevational view of a portion of the structure shown in Fig. 1, showing the manner in which the drill is supported in its movement to and from the workpiece;

Fig. 8 is a view similar to Fig. 7 and showing the parts thereof in a different position;

Fig. 9 is a cross-sectional view taken substantially along the line 9—9 of Fig. 7;

Fig. 10 is a perspective view of a portion of a hinge or connector blank which is the workpiece in the illustrated embodiment;

Fig. 11 is a line diagram showing schematically the electrical circuit for operating the machine of the present invention;

Figure 12:
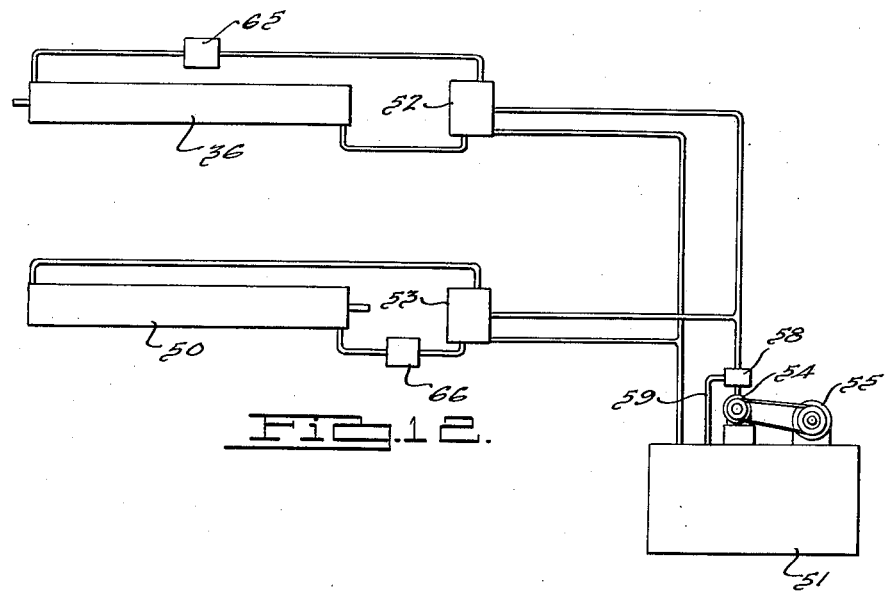
Fig. 12 is a diagrammatic view of the hydraulic feed means employed in the machine of the present invention; and, Fig. 13 is a diagrammatic view of the air-operated clamping means employed in the machine of the present invention.

In general, the present invention is directed to a machine for drilling holes through a workpiece of considerable length; and in the embodiment illustrated, a hinge or connector part having a length of from 36 to 60 inches has a pin or pintle hole drilled therethrough, throughout the length thereof. The drill is of considerable length, it being in excess of 200 times its diameter in length, and in the embodiment illustrated being about 350 times its diameter in length. The operation is a high speed, production operation; and, while not so specifically limited, has particular utility in the drilling of pintle holes in hinge or connector parts. The pintle holes are maintained concentric throughout the lengths of all of the mating hinge parts so that the hinge parts will properly mate. It will be appreciated that if the hole is eccentric there is a loss of strength in the hinge parts and either the hinge sections won't mate or too much clearance will have to be provided.

In the embodiment illustrated, the workpiece is shown in Fig. 10 and comprises an elongated hinge or connector part which is of considerable length. The hinge 1 has a bead 2 formed along one edge, the bead 2 being substantially circular in cross-section. Portions 3 of predetermined length are milled out of the bead 2 to provide alternate spaces and projections. The bead 2 is solid and the pintle holes 4 are drilled through the projections by the machine of the present invention. It will be understood that the hinge 1 is to mate with a complementary hinge part and is connected thereto by a hinge pin which is passed through the aligned openings 4.

The drilling machine of the present invention comprises a base 5 with a workpiece support generally indicated at 6 mounted on the top thereof. The work-support 6 is located intermediate the ends of the base 5, and similar drilling mechanisms generally indicated at 7 are disposed on the top of the base at the opposite ends of the work-support 6. The work-support 6 is of such a length that it may support two workpieces at the same time so that the two drill assemblies 7 may simultaneously drill the holes through two of the workpieces, or, a single workpiece may be drilled from opposite ends at the same time. A description of one of the drilling assemblies will be sufficient for an understanding of both.

The work-support 6 includes a spacer block 8 which extends along the length thereof and which is suitably mounted on the top of the base 5. A coolant drain tray is mounted on the base 5 for the purpose of carrying away the liquid coolant which is directed onto the work during the drilling operation. A mounting block 9 is fixedly mounted on the top of the spacer block 8 and is so fixed thereon that it may be adjusted to properly position a longitudinally extending V-shaped groove 10 with respect to the axis of the drill. The rounded beads formed on the workpieces 1 are adapted to be received within the V-shaped groove 10 and be clamped therein during the drilling operation. A rough locator in the form of plate 11 extending along the front face of the block 8 is fixed thereto. Such plate 11 is formed with an upwardly directed channel 12 within which the leaf of the hinge part is received to support the workpiece prior to clamping.

The workpiece 1 is clamped in the groove 10 by means of a plurality of longitudinally spaced clamping mechanisms generally indicated at 13. Each clamping mechanism comprises a work-engaging plate 14 which extends longitudinally of the workpiece 1 and which is pivotally connected by means of a pivot pin 15 to the inner end of a slide member 16. The member 16 is slidably mounted within an opening 17 in an upstanding bracket 18. The outer end of the member 16 is connected to the inwardly projecting end of rod 19 of a double-acting air cylinder and piston motor 20. The motor 20 is fixedly mounted to a plate 21 which in turn rests upon a horizontal table 22. The sides of the plate 21 extend under the flanges of guide plates 23 which in turn are fixed to the table 22. The motor 20 may thus be adjusted along the table 22 within the guides 23 by means of a screw interconnection therebetween, which is shown at 24. Thus, the clamp 14 may be adjusted toward and from the workpiece. To permit adjustment vertically, the table 22 is fixed to the top of an upstanding bracket 25 which is mounted to the front face of the base 5 for vertical adjustment thereon.

To provide support for the drill in the milled out spaces 3 of the hinge bead 2, accurately formed cylindrical bushings 26 are securely clamped in the V-shaped groove 10 by suitable clamping plates 27 mounted on the block 9. The bushings 26 are disposed to be received in the spaces 3 formed in the hinge bead 2 and the axial end of each bushing 26 adjacent the bead portion 2 into which the drill passes from the bushing during a drilling operation is tapered as indicated at 28 to facilitate the removal of the chips. Because of the accurate formation of the V-shaped groove 10 in the block 9, the bushings 26 when accurately formed and clamped in place by the plates 27 will afford a plurality of accurately aligned passages for supporting the drill.

Referring to Figs. 1, 2, and 7, the drill assembly 7 includes a carriage 30 slidably mounted on a bed 31 formed on or suitably secured to the base 5. An electric motor 32 is mounted on the carriage 30 and is drivingly connected by pulley belts 33 through a gear box 34 to a suitable drill chuck 35. The carriage 30 is reciprocated longitudinally of the bed 31 by means of a hydraulic double-acting cylinder and piston motor 36 mounted on the base 5 and having an elongated piston rod 37 extending outwardly thereof and connected to the carriage 30 through a bracket 38.

A pair of parallel guide bars 40 extend longitudinally of the bed 31 and are supported at their opposite ends in brackets 41 and 42 secured to the bed 31. These guide bars 40 carry automatically adjustable means which at all times properly supports that portion of the drill 43 between the drill chuck 35 and the workpiece 1. As illustrated in Figs. 1 and 2, when the drill 43 is in its fully retracted position, this means supports the entire length of the drill projecting outwardly from the drill chuck 35. This drill-supporting means comprises a plurality of plates 44 which are generally rectangular in shape as best illustrated in Fig. 9 and which are slidably mounted adjacent their opposite ends on the guide bars 40. Each of the plates 44 is provided with a central aperture 45 adapted to freely receive the drill 43 but prevent any appreciable bending thereof. The corresponding ends of adjacent plates 44 are interconnected by pivotally connected links 46, best illustrated in Figs. 7 and 8. At one end of the series of interconnected plates a plate 4 is secured to the bracket 42 and the plate at the opposite end of the series is connected to a bracket 47 mounted on the carriage 30. It will be appreciated that this construction permits the plates 44 to progressively collapse from the completely extended position illustrated in Fig. 1 to the collapsed position illustrated in Fig. 8 as the drilling operation progresses. The bracket 42, which is at the end of the bed 31 adjacent the work support 6, carries a bushing 48 which holds the drill 43 in acurately aligned position preparatory to entering the first portion of the workpiece.

It should be noted that the drill 43 has a long smooth shank portion and the flutes extend only a sufficient distance from the cutting edge to carry the chips from the projecting portion of the bead through which the drill is cutting. This prevents the margin of the flutes from having any tendency to deform the openings in the bead projections or the bushings 26.

It will be appreciated that in the complete machine a second hydraulic cylinder and piston motor 50 similar to the motor 36 is provided for reciprocating the drilling mechanism 7 at the opposite end of the machine from that illustrated in Figs. 1 and 2. These motors 36 and 50 are operated and controlled by means of a hydraulic circuit diagrammatically illustrated in Fig. 12. Fluid under pressure is supplied from the tank 51 to a pair of solenoid-operated valves 52 and 53 individual to the motors 36 and 50 by means of a pump driven by an electric motor 55. A suitable pressure relief valve 58 is provided at the discharge side of the pump, and is provided with the usual bypass 59 returning to the tank 51.

The valves 52 and 53 are of conventional construction and movable between a first position, in which they supply fluid under pressure to their associated motor for moving the piston valve in one direction, and a second position, in which the application of fluid pressure in reversed and is effective for moving the piston in the opposite direction at an increased rate of speed.

Movement of the valve 52 between these positions is effected by means of a shifter rod 60 mounted on the base 5 adjacent the path of movement of the piston rod 37. A shifting dog 61 is mounted on the piston rod 37 adjacent its outer end and engages collars 62 and 62' on the rod 60 as the carriage 30 approaches the opposite limits of its movement to effect a shifting of the rod 60. Movement of the rod 60 energizes and de-energizes the solenoid of the valve 52 by shifting an arm 63 which operates a limit switch D1LS connected to the just-mentioned solenoid as hereinafter described. The limit switch D1LS also forms a part of the drill motor circuit as hereinafter described, and controls rotation of the drill. The switch arm 63 is disposed to be engaged and move by collars 64 and 64' mounted on the shifter rod 60.

To minimize the overall time of the entire drilling operation, means are provided for feeding the drill at an increased rate during the periods in which the drill is passing through the spaces 3 between adjacent portions of the hinge bead. This just-mentioned means comprises solenoid-operated valves 65 and 66 in the lines through which fluid is supplied to the feed motors 36 and 50 during the infeeding of the drill. These valves are adapted to supply fluid to the motors at two different rates to afford a fast and a slow feed of the drill. The valve 65 is controlled by a switch 67 which is opened and closed in response to movement of a spring pressed finger 68 which is mounted on the carriage 30 and rides on a cam 69 adjustably mounted on the bed 31. The cam 69 is proportioned generally similar to the workpiece to be drilled and has alternating projecting and cutaway portions. When the finger 68 drops into the cutaway spaces the valve 65 is shifted to increase the feed. The valve 66 is similarly controlled by a cam operated switch COS.

Figure 13:
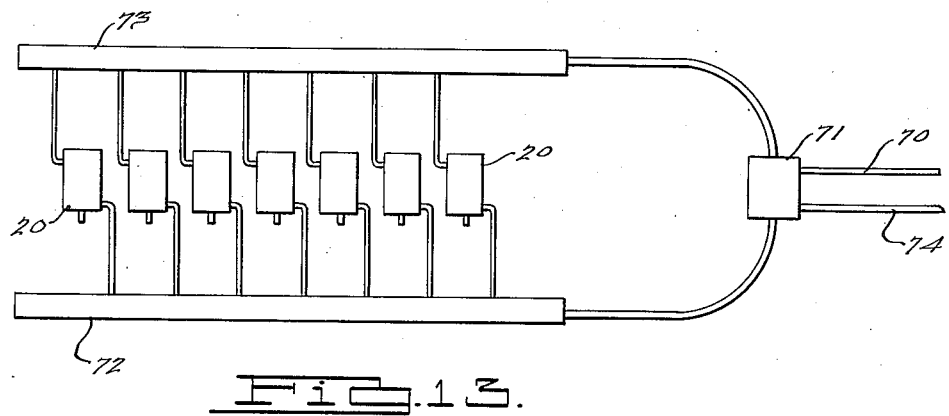

The double-acting air cylinder and piston motors 20 which control the operation of the clamping mechanisms 13 are preferably simultaneously operated. A pneumatic circuit providing this simultaneous operation is illustrated in Fig. 13 and comprises an air supply line 70 adapted to be connected to an air compressor or other suitable source of air under pressure, a solenoid-operated air valve 71, a pair of manifolds 72 and 73 connected to corresponding sides of each of the motors 20 and each connected to the valve 71, and an exhaust line 74. The valve 71 is of conventional construction, and is movable between a first position in which air is supplied to each of the motors 20 to move the pistons thereof in one direction, and a second position in which the air pressure is reversed and is effective to move the pistons in the opposite direction.

A suitable but illustrative wiring diagram for the machine is shown schematically in Figure 14 of the drawings. Electric energy from a suitable source of supply is furnished through lines L1, L2, and L3. A manual pump motor starting switch MS1 is provided having one terminal thereof connected through a manual pump motor stop switch MS2 and a pump motor relay coil PR to the line L3, and the other terminal connected to the line L1. Energization of the coil PR closes switches PS1, PS2, PS3, PS4, PS5, and PS6, thereby operating the hydraulic pump motor 55 and a coolant pump motor 80. Energization of the coil PR also closes the relay holding switch PS7 which is connected in parallel with the manual switch MS1.

A manual drill switch MS3 has one terminal connected through a manual drill stop switch MS4 and switch PS7 to the line L1, and its other terminal is connected through a drill circuit relay coil DCR to the line L3. Energization of the coil DCR closes the drill circuit switches DCS1 and DCS2 each of which has one terminal connected to the line L1 through the switches MS4 and PS7. The other terminals of these switches are connected respectively through first and second drill motor relay coils D1R and D2R and manual switches MS8 and MS9, respectively, to the line L3. Either of the drills may be operated separately by opening the manual switch MS8 or MS9 controlling the other drill. The circuits controlling the rotation and feeding of the two drills are similar and accordingly only the circuits for controlling the first drill are described in detail herein.

The coil D1R, when energized, closes the switches D1S1, D1S2, and D1S3 and thereby operates the motor 32 which rotates the first drill. To maintain the coil D1R energized, it also closes a relay holding switch D1S4 which is connected in series with a limit switch D1LS and both of which are connected in parallel with the drill circuit switch DCS1.

A manual clamp switch MS5 has one terminal connected to the line L3 and its other terminal connected through the solenoid CS of the clamp valve 71 to the line L1.

A manual drill feed switch MS6 has one terminal connected to the line L3 and the other terminal is connected to the line L1 through the solenoid D1F of the valve 52, a switch D1S5, the limit switches CLS1, CLS2, CLS3, CLS4, CLS5, CLS6 and CLS7, the switch MS4 and the switch PS7. The switch D1S5 is closed by energization of the coil D1R and the switches CLS1 through CLS7 are closed when the clamps 13 are abutting the workpiece 1 in clamping position.

Similarly, the coil D2R closes switches D2S1, D2S2, and D2S3 to operate the second drill motor, D2, corresponding to the motor 32. Also it closes a switch D2S4 which is in series with a limit switch D2LS and both of which are in parallel with switch DCS2. Also a manual switch MS7, a solenoid D2F, and a switch D2S5 are connected in parallel with the corresponding just-mentioned solenoid D1F and switches MS6, and D1S5 and control the feed of the second drill at the other end of the machine.

The electrical circuit for effecting the above-described change in the rate of feed of the drill 43 extends from the line L3 through the solenoid D1FR which operates the valve 65 to vary the rate of feed, the cam operated switch 67, and switches MS4 and PS7 to line L1. Similarly for controlling the feed rate of the second drill, the solenoid D2FR of the valve 66 and a cam-operated switch COS are connected in parallel with the solenoid D1FR and the switch 67.

In operating the above described machine, a workpiece 1 is placed in the position illustrated in Figure 3 with the bead portion thereof supported in the channel 12 of the rough locating plate 11 with the bushings 26 received in the spaces 3 of the workpiece as best illustrated in Figure 6. The manual switch MS1 is then closed which starts the hydraulic pump and coolant motors 55 and 80 as above described, and the manual switch MS3 is then closed which starts the drill motors 32 and D2 as above described provided the manual switches MS8 and MS9 are closed. This closing of the switch MS3 also closes the switches D1S5 and D2S5 in the drill feed circuits, which switches serve to prevent feeding of the drills until the drill motors 32 and D2 have been started. It is also necessary to close the manual switch MS5 by which the clamping mechanisms are moved into clamping position before the drill feed circuits may be completed. When the clamps move to the clamping positions, the limit switches CLS1 through CLS7, which are common to the drill feed circuits are closed and these circuits may then be completed and the drills fed through the workpieces by closing the manual switches MS6 and MS7. During the drilling operation, the rate of feed of the drills is controlled by the cams 69 and D2C so that the drill carriages move at a slower speed suitable for drilling when the drills are cutting through a projecting bead portion, and move more rapidly when the drills are passing through the spaces 3 intermediate the projecting bead portions, as above described. In passing through the workpiece 1 as the drills enter each successive portion of the bead 2, they are held in proper aligned position by the bushings 26. Also, during this drilling operation, the portion of the drills between the drill chuck 35 and the workpiece 1 is supported by the plurality of plates 44 which progressively collapse to the position illustrated in Figure 8 as a drilling operation progresses. As the drills reach the limit of their movement, the shifter rod 60 is moved by the dog 61 as above described, and the limit switches D1LS and D2LS are opened. Opening of these switches de-energizes the coils D1R and D2R thereby stopping the drill motors 32 and D2 and opening the switches D1S5 and D2S5 in the drill feed circuits. This de-energizes the solenoids D1F and D2F of the valves 52 and 53 causing the latter to shift so as to apply hydraulic pressure to the motors 36 and 50 to return the drill carriages to their retracted positions. As the carriages approach the retracted position the shifter rods are shifted back to their initial position and the limit switches D1LS and D2LS are again closed. Also as the carriage 30 and drill 43 return to the retracted position illustrated in Figs. 1 and 2 it will be appreciated that the drill supporting plates will be again spread from the collapsed position of Fig. 8 to the expanded position illustrated in Figs. 1 and 2.

Although only one embodiment of the invention has been illustrated and described in detail, it will be appreciated by those skilled in the art that numerous modifications and changes may be made without departing from the spirit of the invention or the scope of the appended claims.

What is claimed is:

1. In a deep hole drilling machine for drilling precisely aligned openings through a plurality of spaced projections of an elongated workpiece, a combined workpiece supporting and drill guiding means comprising a member having surfaces formed on one face disposed with respect to each other to define angularly related locating surfaces, means to clamp said workpiece against said member with said projections disposed against said locating surfaces to precisely align said projections, drill guide elements having guide openings therethrough for receiving and guiding a drill as it drills through said spaced projections, said elements being disposed in the spaces between said projections, and means holding said elements against said locating surfaces with the guide openings therein precisely aligned with each other and with the projections.

2. In a deep hole drilling machine for drilling precisely aligned openings through a plurality of spaced, beaded projections of an elongated workpiece, a combined workpiece supporting and drill guiding means comprising a member having surfaces formed on one face disposed with respect to each other to define V-grooved locating surfaces, means to clamp said workpiece against said member with said beaded projections disposed against said locating surfaces to precisely align said projections, drill guide bushings having guide openings therethrough for receiving and guiding a drill as it drills through said spaced projections, said elements being disposed in the spaces between said projections, and means holding said elements against said locating surfaces with the guide openings therein precisely aligned with each other and with the projections.

3. In a deep hole drilling machine for drilling precisely aligned openings through a plurality of spaced, beaded projections of an elongated workpiece, a combined work piece supporting and drill guiding means comprising a member having surfaces formed on one face disposed with respect to each other to define V-grooved locating surfaces, means to clamp said workpiece against said member with said beaded projections disposed against said locating surfaces to precisely align said projections, drill guide bushings having guide openings therethrough for receiving and guiding a drill as it drills through said spaced projections, said elements being disposed in the spaces between said projections, and means holding said elements against said locating surfaces with the guide openings therein precisely aligned with each other and with the projection, the adjacent faces of said guide bushings being spaced from each other a distance greater than the length of each bushing.

ROGER G. CUDINI.

REFERENCES CITED

The following references are of record in the file of this patent:

UNITED STATES PATENTS

| Number | Name | Date |
|---|---|---|
| 105,488 | Parker | July 19, 1870 |
| 596,782 | Mason | Jan. 4, 1898 |
| 1,425,202 | Hibbard | Aug. 8, 1922 |
| 2,007,953 | Barnes et al. | July 16, 1935 |